United States Patent
Luski et al.

(10) Patent No.: US 10,834,333 B1
(45) Date of Patent: Nov. 10, 2020

(54) SWITCH BOX FOR SECURITY SYSTEM HAVING A PUBLIC VIEW MONITOR

(71) Applicant: Innotech Security, Inc., Pampano Beach, FL (US)

(72) Inventors: Moshe Luski, Cooper City, FL (US); Devin Benjamin, Pompano Beach, FL (US)

(73) Assignee: Innotech Security, Inc., Pampano Beach, FL (US)

( * ) Notice: Subject to any disclaimer, the term of this patent is extended or adjusted under 35 U.S.C. 154(b) by 388 days.

(21) Appl. No.: 15/233,396

(22) Filed: Aug. 10, 2016

Related U.S. Application Data

(60) Provisional application No. 62/203,186, filed on Aug. 10, 2015.

(51) Int. Cl.
| | |
|---|---|
| *H04N 5/268* | (2006.01) |
| *H04N 7/18* | (2006.01) |
| *G08B 13/196* | (2006.01) |
| *G09G 5/395* | (2006.01) |

(52) U.S. Cl.
CPC ....... *H04N 5/268* (2013.01); *G08B 13/19678* (2013.01); *G09G 5/395* (2013.01); *H04N 7/181* (2013.01); *G09G 2360/127* (2013.01)

(58) Field of Classification Search
CPC ........ H04N 5/268; H04N 7/181; G09G 5/395; G09G 2360/127; G08B 13/19678
See application file for complete search history.

(56) References Cited

U.S. PATENT DOCUMENTS

| | | | | |
|---|---|---|---|---|
| 4,994,916 A | * | 2/1991 | Pshtissky | G08B 13/19634 348/159 |
| 5,903,321 A | * | 5/1999 | Tung | G08B 13/19663 348/220.1 |
| 7,486,340 B2 | | 2/2009 | Lee et al. | |
| 2004/0148419 A1 | * | 7/2004 | Chen | H04L 29/06 709/231 |
| 2008/0118062 A1 | * | 5/2008 | Radivojevic | G09G 3/002 380/210 |
| 2008/0186664 A1 | | 8/2008 | Chang et al. | |
| 2009/0279002 A1 | | 11/2009 | Xie | |
| 2012/0038827 A1 | * | 2/2012 | Davis | H04N 5/45 348/588 |
| 2012/0305503 A1 | * | 12/2012 | Smith | G06F 1/1613 211/26 |
| 2014/0362223 A1 | | 12/2014 | LaCroix et al. | |
| 2015/0022626 A1 | * | 1/2015 | Nahla | H04N 7/147 348/14.09 |
| 2017/0105053 A1 | * | 4/2017 | Todd | H04N 5/45 |

OTHER PUBLICATIONS

Chang et al., English Translation of TW 516312 A (Year: 2003).*

* cited by examiner

*Primary Examiner* — Joseph G Ustaris
*Assistant Examiner* — Jill D Sechser
(74) *Attorney, Agent, or Firm* — DLA Piper LLP US

(57) ABSTRACT

A multiple input multi-media switch box allowing for communication between video surveillance cameras, a multi-media player, and a public view monitor for seamless transitions between frames and or advertising media is disclosed. The switch box displays a first video surveillance content on the PVM for a predetermined time, the converter switch freezes the last frame on the first video surveillance image and displays advertising media while buffering the new input from a second video surveillance, then the converter switch releases and displays the new input from the second video surveillance video.

20 Claims, 4 Drawing Sheets

SWITCH BOX FOR SECURITY SYSTEM HAVING A PUBLIC VIEW MONITOR

PRIORITY CLAIM

In accordance with 37 C.F.R. 1.76, a claim of priority is included in an Application Data Sheet filed concurrently herewith. Accordingly, the present invention claims priority under 35 U.S.C. § 119(e), 120, 121, and/or 365 to U.S. Provisional Patent Application No. 62/203,186, entitled "MULTIPLE VIDEO INPUT MULTI-MEDIA SWITCH BOX IN CONJUNCTION WITH A PUBLIC VIEW MONITOR," filed Aug. 10, 2015. The contents of the above referenced application are incorporated herein by reference in its entirety.

FIELD OF THE INVENTION

The present invention relates generally to security systems, and more particularly, to a multiple input multi-media switch box allowing for communication between video surveillance cameras, a multi-media player, and a public view monitor for seamless transitions between frames of security video and/or advertising media.

BACKGROUND OF THE INVENTION

Owners of retail establishments are under a constant struggle to provide consumers with a range of products at competitive prices and a pleasant shopping experience while also controlling cost. A major factor that increases the cost of products is loss of product due to theft, especially for high-value items. Increasingly, retail establishments are deploying theft deterrent systems at product display areas to combat product loss and the growing threat of retail crime.

An anti-theft system is any device or method used to prevent or deter the unauthorized appropriation of items considered valuable. Theft is one of the most common and oldest criminal behaviors. From the invention of the first lock and key to the introduction of RFID tags and biometric identification, anti-theft systems have evolved to match the introduction of new inventions to society and the resulting theft of them by others. Motive and opportunity are two enabling factors for theft. Given that motives for theft are varied and complex, and are, generally speaking, not within the control of the victim, most methods of theft prevention rely on reducing opportunities for theft. Items may require an anti-theft system for a variety of reasons, which may occur in combination depending on the type of item and its use, such as: the item is expensive and/or has sentimental value (prestigious car, family heirloom, birthday gift, war medals, coin collection); the item is difficult/impossible to replace if lost (produced in low numbers, antiques, unique works of art); the item is easy to steal (retail/supermarket products, office stationery, no security tags); the item may be left unattended in an unsafe environment (laptops in a library, cars in a car parking lot); the item is desirable to others (jewelry, mobile phones, rare collectibles, auto parts, industrial designs); or the item is otherwise un-obtainable (alcohol, tobacco products, age related substances).

Current theft deterrent systems use a variety of components to monitor retail establishments for suspicious activity and to detect loss. These systems include components such as video cameras and recorders and public view monitors (PVM) mounted at exit and entry points of the retail establishments. The public view monitors display the video from the video cameras to provide awareness to the consumers that they are under surveillance as part of the loss prevention strategy. Unfortunately, PVM images "jump" when switching between inputs from multiple video surveillance cameras, or when switching from one video surveillance camera to advertising media and back to video surveillance. Because there is no smooth transition, consumers and thieves alike may question the quality and integrity of the security system.

Advertising is a form of marketing communication used to persuade an audience to take or continue some action, usually with respect to a commercial offering, or political or ideological support. Commercial advertisers often seek to generate increased consumption of their products or services through "branding", which involves associating a product name or image with certain qualities in the minds of consumers. Other advertising opportunities, such as popup, flash, banner, and adver-gaming, are now commonplace. Thus, with the PVM being displayed in areas of high traffic, it would be advantageous to use the PVM for advertising purposes due to the fact that public view monitors are often placed in point of sale areas. A PVM can also be used as digital signage for displaying in-store promotions at a variety of other locations in the store. However, when advertising is combined with a PVM, the system is required to switch the monitor to an auxiliary piece of equipment like a DVD player. When switching, the picture is delayed and/or jumps while the picture is sufficiently spooled to display a steady picture to the viewer.

Thus, what is lacking in the art is a multiple input multi-media switch box that allows for communication between video surveillance cameras, a multi-media player, and a public view monitor for seamless transitions between frames and or advertising media.

SUMMARY OF THE INVENTION

A multiple input multi-media switch box allowing for communication between video surveillance cameras, a multi-media player, and a public view monitor for seamless transitions between frames and or advertising media is disclosed. The multiple input multi-media switch box is comprised of a switch box having at least one external input for a video surveillance camera, a computer with a built-in multi-media player, a power source, an output for a public view monitor, and a converter switch. The switch box displays a first video surveillance image of the first camera on the PVM for a predetermined time, the converter switch freezes the last image of the last frame on the first video surveillance video and displays advertising media while buffering the new input from a second video surveillance, then the converter switch releases and displays the new input from the second video surveillance video. In an alternative embodiment, the switch box anticipates the switch to another media display and pre-spools sufficient data to change the media without the jump normally associated with the change in media being displayed.

Accordingly, it is an objective of the present invention to provide a multiple input multi-media switch box that avoids display jumps between frames by utilizing a converter switch to create smooth transitions between different video surveillance input frames as well as between video surveillance input frames and advertising media.

It is a further objective of the present invention to provide a multiple input multi-media switch box that can display digital signage, visual promotional advertising, or corporate messages to anyone in plain view of the PVM.

It is another objective of the present invention to provide a multiple input multi-media switch box wherein the converter switch allows for operator configuration regarding the amount of time advertising media is displayed between video surveillance images.

It is a further objective of the present invention to provide a multiple input multi-media switch box that alleviates "jumps" on the PVM when switching between multiple video surveillance cameras. The instant invention provides a smooth transition between multiple video surveillance cameras, or when switching from one video surveillance camera to advertising media and back to video surveillance.

It is still a further objective of the present invention to provide a multiple input multi-media switch box that can include multiple inputs for multiple video surveillance cameras.

Still a further objective of the present invention is to provide a multiple input multi-media switch box that syncs existing video surveillance cameras to provide smooth transitions between existing multiple video surveillance cameras.

It is yet a further objective of the present invention to provide a multiple input multi-media switch box that includes internal data storage for spooling video for smooth switching of the video input.

It is still yet another objective of the present invention to provide a multi-media switch box that anticipates a video switch and spools a sufficient amount of video to switch inputs without causing jumping on the video screen.

It is still yet another objective of the present invention to provide a multiple input multi-media switch box that avoids display jumps between frames by utilizing a converter switch to create smooth transitions of multiple video surveillance input frames.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
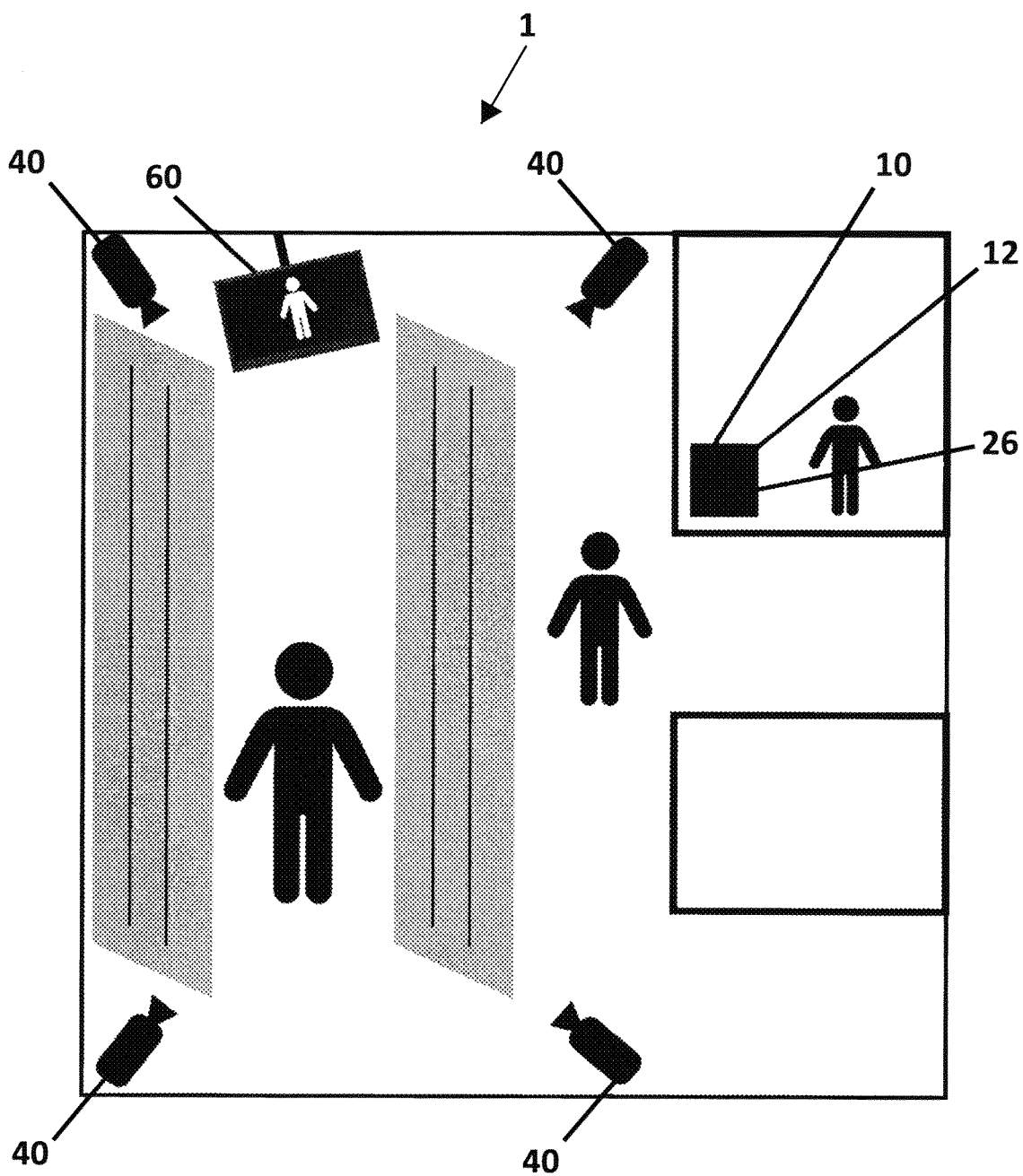
FIG. 1 is a pictorial representation of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring initially to FIG. 1, a diagram illustrates the multiple input multi-media switch box system 1, according to an embodiment of the present invention. Multiple video surveillance cameras 40 are positioned at multiple locations throughout a consumer environment such as, for example, a retail business establishment. A public view monitor (PVM) 60 shows a real time view of the surveillance camera footage. Preferably, the public view monitor 60 is positioned in a high traffic area of the store. The multiple input multi-media switch box 10 can be placed in a location where all the wires from the surveillance cameras 40 and public view monitor 60 converge, such as an office, security room etc. The switch box is comprised of a housing 12 which in one embodiment includes a built-in multi-media player 26, discussed further below, that would run in sequence between one surveillance camera image to another. The multi-media player 26 can play any user created image or movie such as, but not limited to, advertising medium.

Figure 2:
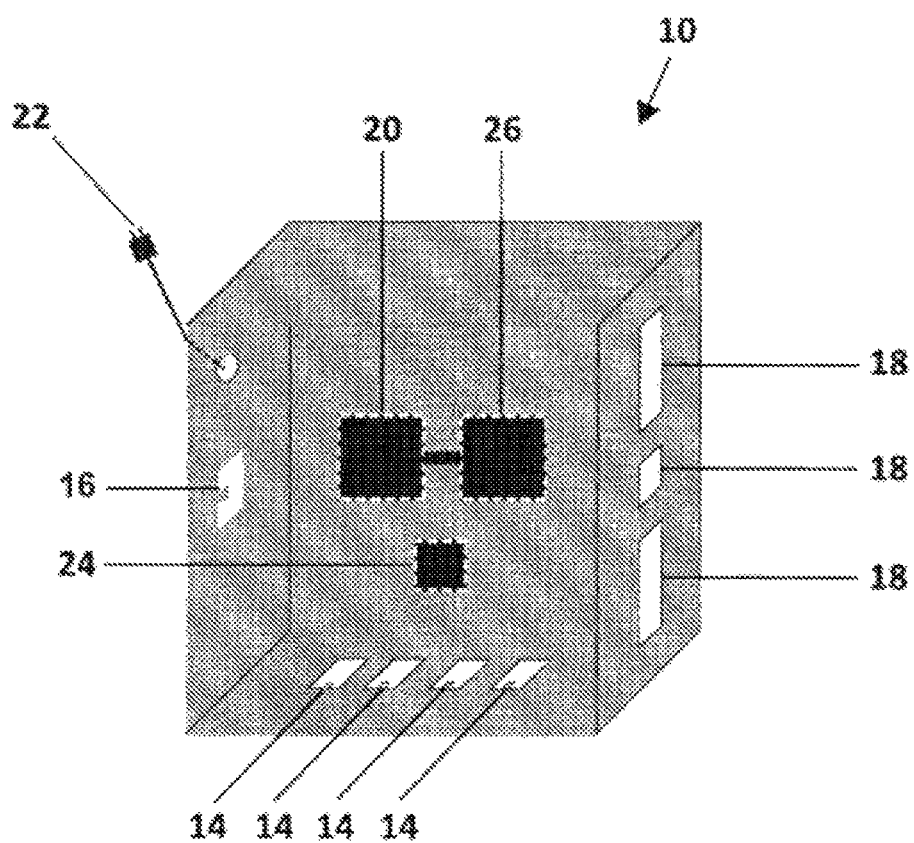
FIG. 2 is a perspective view of the multiple input multi-media switch box of the instant invention.

Referring now to FIG. 2, a multiple input multi-media switch box 10 allowing for communication between video surveillance cameras 40, a multi-media player 26, and a public view monitor 60 for seamless transitions between frames from the video surveillance content and or advertising media is disclosed. The multiple input multi-media switch box 10 is comprised of a housing 12 having at least one external video input 14 from the video surveillance cameras 40, a computer processor 20 with a built-in multi-media player 26, an input for the multi-media content 18, such as but not limited to an SD card, thumb drive, hard drive or the like, a power source 22, a display and sync output 16 to the public view monitor 60, and a converter switch 24. The switch box 10 displays a first video surveillance image on the PVM 60. After a predetermined time, the converter switch 24 freezes the last frame on the first video surveillance image and displays advertising media from the multi-media player 26 while buffering the new input from a second video surveillance image. Then, the converter switch 24 releases and displays the new input from the second video surveillance video. In another embodiment, the switch box 10 displays a first video surveillance image on the PVM 60. After a predetermined time, the converter switch 24 freezes the last image on the last frame on the first video surveillance image and buffers the new input from a second video surveillance image. Then, the converter switch 24 releases and displays the new input from the second video surveillance video.

Figure 3:
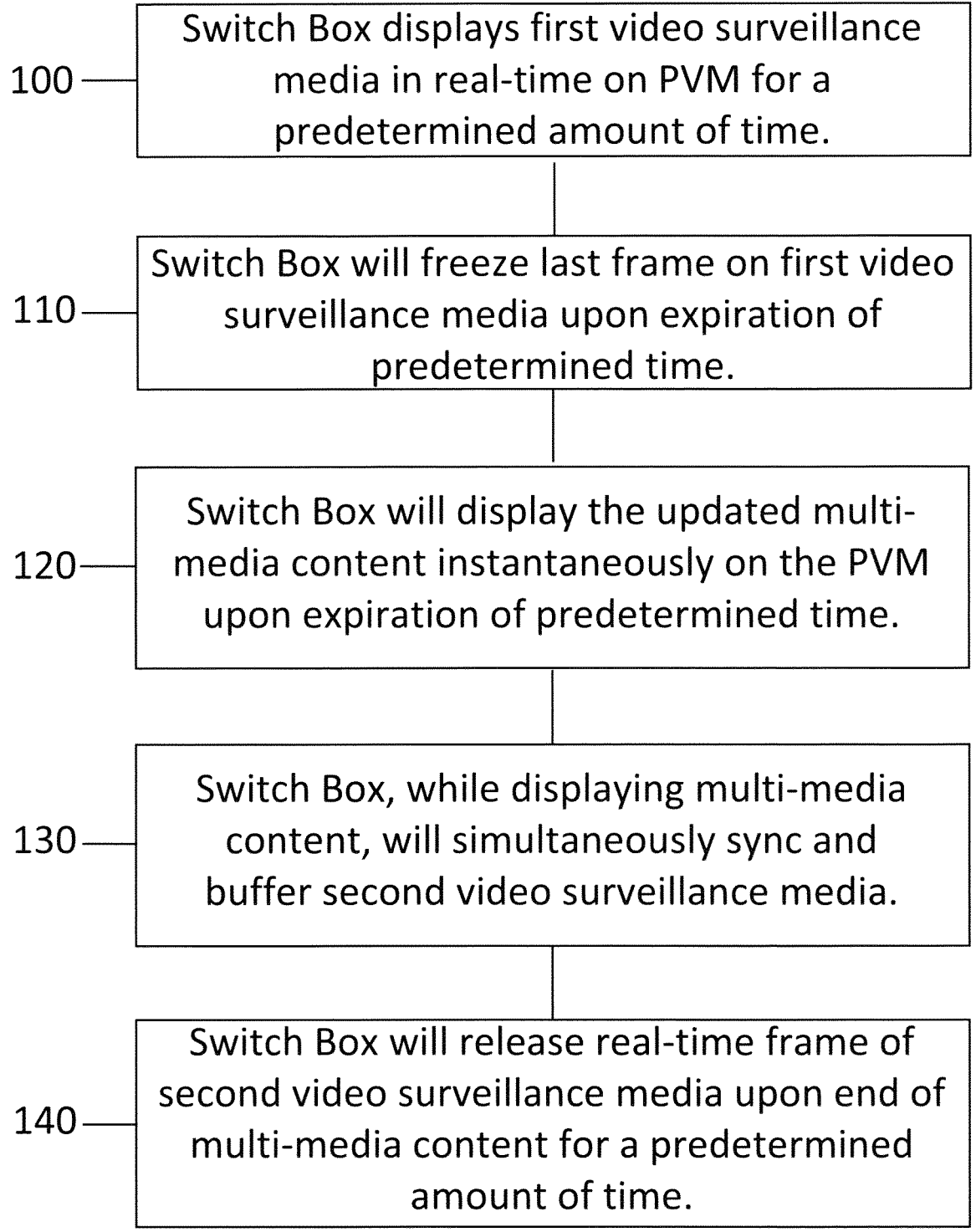
FIG. 3 is a flow chart diagram of the timing sequence of the instant invention.

Referring now to FIG. 3, a flow chart diagram illustrates an advertising media content having real time video surveillance footage through the PVM, according to an embodiment of the present invention. The methodology begins by Block 100, whereby the switch box will display on the PVM a first video surveillance media in real-time. The PVM will display real-time footage from the first video surveillance camera for a predetermined amount of time as desired by the user. Then in Block 110, the switch box will freeze the last frame on the first video surveillance camera when the predetermined amount of time has expired. Next, in Block 120, the switch box will display the multi-media content instantaneously on the PVM upon expiration of the first video surveillance media. The multi-media content can consist of any media as discussed above. The content can last for a predetermined amount of time as set by the user. The multi-media content would be uploaded into the processor in the switch box prior to use. Then in Block 130, the switch box, while displaying the multi-media content, will instantaneously sync and buffer the next channel, the second video surveillance media. Lastly in Block 140, the switch box converter will release the real-time frame from the second video surveillance camera upon the end of the multi-media content.

In another embodiment, not shown, the methodology begins by the switch box displaying on the PVM a first video surveillance media in real-time. The PVM will display real-time footage from the first video surveillance camera for a predetermined amount of time as desired by the user. Then the switch box, while displaying the first video surveillance content, will instantaneously sync and buffer the next channel, the second video surveillance media. Then the switch box will freeze the last frame on the first video surveillance camera when the predetermined amount of time has expired. Lastly, the switch box converter will release the real-time frame from the second video surveillance camera upon the end of the first video surveillance content.

Figure 4:
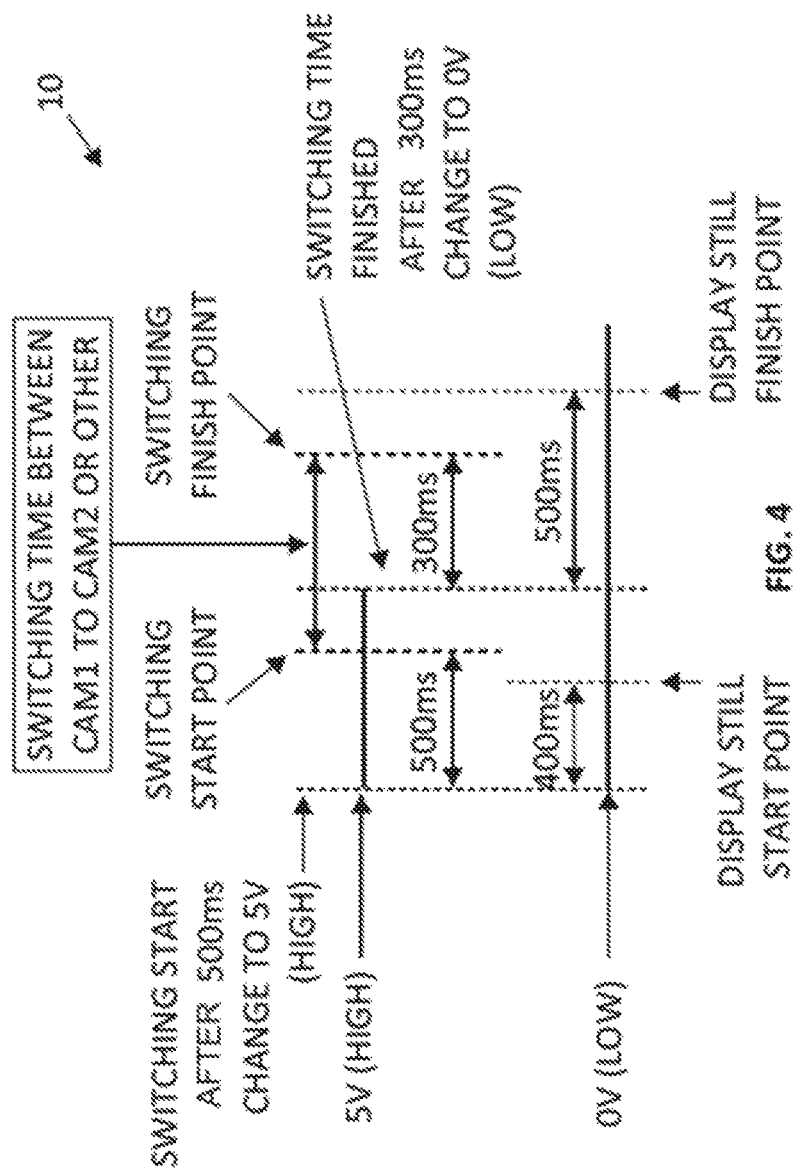
FIG. 4 is a timing diagram of the instant invention.

Now referring to FIG. 4, a timing diagram whereby the multiple input multi-media switch box avoids display jumps between frames by utilizing a converter switch to create smooth transitions between different video surveillance input frames. The switch box displays a first video surveillance image on the PVM. After a predetermined time, the converter switch freezes the last image on the last frame on the first video surveillance image and buffers the new input from a second video surveillance image. Then, the converter switch releases and displays the new input from the second video surveillance video. As shown, the switch box switches between a low and high voltage during the switching time between a first and second video surveillance image.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A switch box for a security system comprising:
    at least a first input electronically coupled to a first image source and a second input electronically coupled to a second image source;
    at least one output electronically coupled to at least one public view monitor;
    a computer processor electronically coupled to the first input, the second input, and the at least one output;
    a memory electronically coupled to the computer processor; and
    a converter switch electronically coupled to the computer processor, the converter switch being configured to simultaneously and directly receive a first video image from the first image source via the first input and a second video image from the second image source via the second input and to output a display signal to the at least one public view monitor by the at least one output, wherein the computer processor is configured to control the converter switch to:
        output the first video image received from the first image source from the first input to display the first video surveillance image on the at least one public view monitor in real-time while simultaneously buffering the second video image received from the second image source from the second input in the memory;
        freeze the display of the first video surveillance image on a last frame for a first period of time before a voltage change of the converter switch and for a second period of time after the voltage change of the converter switch;
        during the freezing of the first video surveillance image, release the buffered second video image to the at least one public view monitor at the time of the voltage change of the converter switch; and
        display the buffered second video image on the at least one public view monitor.

2. The switch box for a security system of claim 1, wherein the second image source includes a multi-media source electronically coupled to the computer processor.

3. The switch box for a security system of claim 2, wherein the multi-media source is disposed within a housing also containing the switch box.

4. The switch box for a security system of claim 2, wherein the multi-media source includes an SD card.

5. The switch box for a security system of claim 2, wherein the multi-media source includes a thumb drive.

6. The switch box for a security system of claim 2, wherein the multi-media source includes a hard drive.

7. The switch box for a security system of claim 2, wherein the multi-media source includes a media player electronically coupled to the computer processor through at least one input.

8. The switch box for a security system of claim 1, wherein at least one of the first image source and the second image source includes at least one surveillance camera.

9. The switch box for a security system of claim 1, further comprising a power source electronically coupled to the computer processor.

10. The switch box for a security system of claim 9, wherein the power source includes the at least one public view monitor.

11. The switch box for a security system of claim 1, wherein the computer processor is configured to:
    control the converter switch to output the first video image from the first image source as the display signal in real-time, and
    display the first video image on the at least one public view monitor for a predetermined time.

12. The switch box for a security system of claim 1, wherein the computer processor is configured to:
    freeze a last frame of the first video image while simultaneously buffering the second video image in the memory; and release and display the second video image in real-time upon the end of the predetermined time.

13. A method for displaying security system images in real-time comprising:
    simultaneously and directly receiving a first video surveillance image from a first camera via a first input and receiving a second video image;
    sending the first video surveillance image to at least one public view monitor;
    displaying the first video surveillance image on the at least one public view monitor in real-time;
    while sending the first video surveillance image received from the first camera from a first input to the at least one public view monitor, simultaneously buffering the second video image;
    freezing the display of the first video surveillance image on a last frame for a first period of time before a voltage change of the converter switch and for a second period of time after the voltage change of the converter switch;
    during the freezing of the first video surveillance image, releasing the buffered second video image to the at least one public view monitor at the time of the voltage change of the converter switch; and
    displaying the buffered second video image on the at least one public view monitor.

14. The method for displaying security system images of claim 13, wherein the second video image is an advertising media image received from a second input.

15. The method for displaying security system images of claim 13, further comprising setting a predetermined time for displaying the first video surveillance image on the at least one public view monitor.

16. The method for displaying security system images of claim 13, wherein the second video image is a second video surveillance image received from the first camera.

17. The method for displaying security system images of claim 16, further comprising:
    receiving a third video image from a second video camera via a third input;
    while sending the first video surveillance image or the second video image to the at least one public view monitor, buffering the third video image;
    freezing the second video image on a last frame;
    during or after the freezing of the second video image, releasing the buffered third video image to the at least one public view monitor; and
    displaying the buffered third video image on the at least one public view monitor.

18. The method for displaying security system images of claim 17, further comprising setting a predetermined time for displaying the first video surveillance image on the at least one public view monitor.

19. The method for displaying security system images of claim 18, further comprising setting a predetermined time for displaying the third video image on the at least one public view monitor.

20. The method for displaying security system images of claim 19, further comprising buffering the first video surveillance image.

* * * * *